(12) United States Patent
Chen

(10) Patent No.: US 7,882,704 B2
(45) Date of Patent: *Feb. 8, 2011

(54) FLAME STABILITY ENHANCEMENT

(75) Inventor: Alexander G. Chen, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1036 days.

This patent is subject to a terminal disclaimer.

(21) Appl. No.: 11/654,847

(22) Filed: Jan. 18, 2007

(65) Prior Publication Data

US 2008/0173003 A1    Jul. 24, 2008

(51) Int. Cl.
*F02C 7/08* (2006.01)

(52) U.S. Cl. .................... 60/736; 95/155; 96/6; 122/23; 55/315; 210/175

(58) Field of Classification Search .................... 60/736, 60/734, 39.12, 772; 95/155, 46, 54; 96/6, 96/241; 122/23; 55/315; 210/175, 180, 210/188, 774

See application file for complete search history.

(56) References Cited

U.S. PATENT DOCUMENTS

| | | | | |
|---|---|---|---|---|
| 5,123,937 A | * | 6/1992 | Shibata et al. | 95/46 |
| 5,522,917 A | * | 6/1996 | Honda et al. | 95/46 |
| 6,315,815 B1 | * | 11/2001 | Spadaccini et al. | 95/46 |
| 7,153,343 B2 | * | 12/2006 | Burlatsky et al. | 95/46 |
| 7,260,926 B2 | * | 8/2007 | Sabatino et al. | 60/206 |
| 7,322,198 B2 | * | 1/2008 | Roby et al. | 60/776 |
| 7,377,112 B2 | * | 5/2008 | Spadaccini et al. | 60/772 |
| 7,393,388 B2 | * | 7/2008 | Spadaccini et al. | 96/6 |
| 7,431,818 B2 | * | 10/2008 | Cipollini | 205/695 |
| 7,537,646 B2 | * | 5/2009 | Chen et al. | 96/6 |
| 7,582,137 B2 | * | 9/2009 | Chen et al. | 95/46 |
| 2004/0194848 A1 | * | 10/2004 | Sauer | 141/82 |
| 2005/0155353 A1 | * | 7/2005 | Sabatino et al. | 60/772 |
| 2006/0263277 A1 | * | 11/2006 | Tillman et al. | 422/188 |
| 2007/0101731 A1 | * | 5/2007 | Bayt et al. | 62/7 |
| 2007/0130956 A1 | * | 6/2007 | Chen | 60/780 |

FOREIGN PATENT DOCUMENTS

| | | |
|---|---|---|
| EP | 1736652 A2 | 12/2006 |
| EP | 1775514 A2 | 4/2007 |

OTHER PUBLICATIONS

Extended European Search Report for EP 08250135.4 mailed on May 20, 2010.

* cited by examiner

*Primary Examiner*—William H Rodriguez
(74) *Attorney, Agent, or Firm*—Carlson, Gaskey & Olds, P.C.

(57) ABSTRACT

A fuel delivery system includes a fuel stabilization unit that removes dissolved oxygen from liquid fuel to increase the temperature at which the liquid fuel can be elevated without substantial formation of insoluble products. At least a portion of the fuel with reduced amounts of dissolved oxygen is vaporized prior to entering a combustion device to improve mixing and combustor performance.

14 Claims, 2 Drawing Sheets

FLAME STABILITY ENHANCEMENT

BACKGROUND OF THE INVENTION

This invention generally relates to a fuel delivery system and method for an energy conversion device. More particularly, this invention relates to a method for conditioning a fuel-air mixture to improve combustion.

Energy conversion devices such as for example, a gas turbine engine transform energy within fuel to produce useful work. Fuel is mixed with air and ignited within a combustion chamber to release this energy, for example by creating a flow of exhaust gases in a gas turbine engine. The fuel typically includes an amount of dissolved oxygen. The dissolved oxygen within the fuel causes autooxidative reactions to occur at elevated fuel temperatures. The autooxidative reactions produce insoluble products commonly referred to as "coke" or "coking". This "coking" is not desirable as it can clog and disrupt fuel flow and thereby limits the temperature at which fuel may be heated.

Conventional gas turbine engines utilize liquid fuel as a cooling medium to remove heat from other systems. Reducing dissolved oxygen from the liquid fuel increases the temperature threshold at which autooxidative reactions reach a certain reaction rate, thereby increasing the thermal capacity for removing heat to the liquid fuel. Removal of oxygen from fuel to increase the thermal capacity of the fuel to provide an increased capacity for removing heat from other systems.

Fuel is combined with air in a combustor of the typical gas turbine engine, or in other types of combustion chambers for other known energy conversion devices. Fuel entering the combustor is typically in a liquid phase. The fuel vaporizes due to heat in the combustor and then reacts with the oxidizer. However, fuel in vapor phase burns more readily than the liquid fuel because it has already been vaporized and is typical of higher temperature than liquid fuel due to evaporation. However, fuel is not typically heated to a temperature that will vaporize a portion of the liquid fuel before entering the combustor due to the limitations on fuel temperature to avoid undesirable coking.

Accordingly, it is desirable to design and develop a system and method for vaporizing fuel prior to entering the combustor and introducing the vaporized fuel into the combustor in a proper manner to improve flame stabilization and burn efficiency within a combustor.

SUMMARY OF THE INVENTION

A fuel delivery system includes a fuel stabilization unit that removes dissolved oxygen from liquid fuel to increase the temperature at which the liquid fuel can be elevated without the significant formation of insoluble products. At least a portion of the fuel is vaporized prior to entering a combustion device to improve mixing and combustor performance.

The fuel delivery system includes the fuel stabilization unit that removes dissolved oxygen from liquid fuel provided from a storage unit. Liquid fuel from the storage unit includes dissolved oxygen in amounts that can contribute significantly to the formation of undesirable insoluble products known commonly as "coke" or "coking" through autooxidative reactions at elevated temperatures. The fuel stabilization unit removes much of the dissolved oxygen from the liquid fuel to increase the temperature at which the liquid fuel can be elevated without the significant formation of insoluble products.

Removal of dissolved oxygen from the fuel provides for the elevation of liquid fuel to a temperature capable of vaporizing at least a portion of the liquid fuel without the formation of undesirable amounts of "coke". The ratio of fuel in liquid phase to fuel in gaseous phase can be adjusted to provide desired combustion properties.

The example fuel stabilization unit includes an oxygen permeable membrane that is supported on a porous support. Liquid fuel flows through a passage defined at least partially by the permeable membrane. An oxygen partial pressure differential is generated across the permeable membrane to draw dissolved oxygen from the liquid fuel. The removed oxygen is then exhausted away from the liquid fuel.

Accordingly, the fuel delivery system of this invention removes significant levels of dissolved oxygen from a liquid fuel to provide for vaporization of fuel prior to entering a combustion device to improve combustion performance.

These and other features of the present invention can be best understood from the following specification and drawings, the following of which is a brief description.

DETAILED DESCRIPTION OF THE PREFERRED EMBODIMENT

Figure 1:
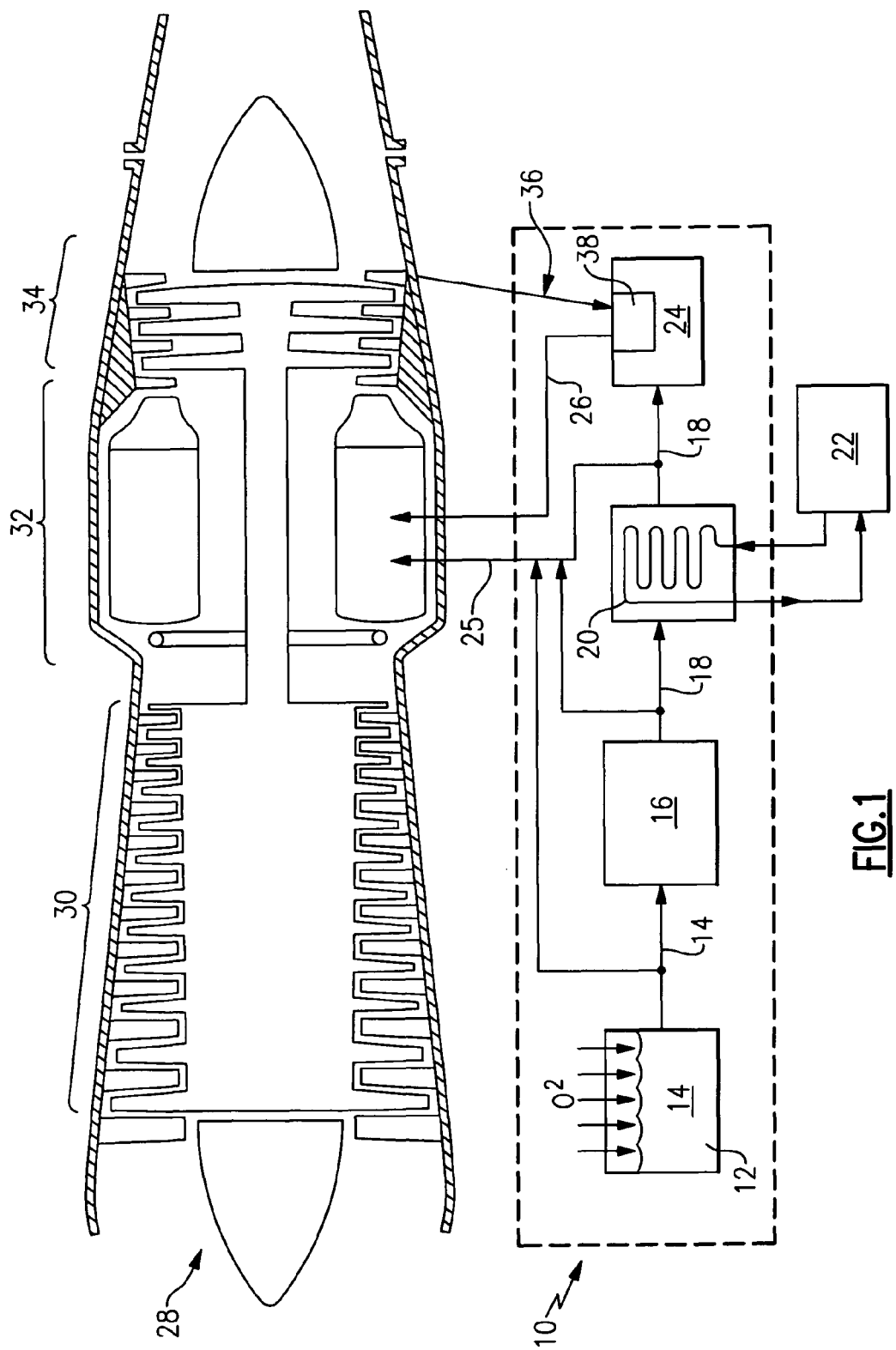
FIG. 1, is a schematic view of an example fuel delivery system.

Referring to FIG. 1, an example fuel delivery system 10 includes a fuel stabilization unit 16 that removes dissolved oxygen from liquid fuel provided from a storage unit 12. Liquid fuel 14 from the storage unit 12 includes dissolved oxygen in amounts that can contribute to the formation of significant amounts of undesirable insoluble products known commonly as "coke" or "coking" through autooxidative reactions at elevated temperatures. The fuel stabilization unit 16 removes much of the dissolved oxygen from the liquid fuel to increase the temperature at which the liquid fuel can be elevated without the significant formation of insoluble products. Increasing the temperature that the liquid fuel can be elevated increases the thermal capacity that can be utilized to accept heat for cooling other systems.

The example fuel delivery system 10 provides a fuel-air mixture to an energy conversion device. The fuel-air mixture to the energy conversion device can include a liquid portion and a fuel vapor and air portion. The specific combination of liquid fuel and vaporized fuel injected into the energy conversion device can be adjusted depending on application specific requirements.

In the disclosed example, the energy conversion device is a gas turbine engine 28 that includes a compressor module 30, a combustor module 32 and a turbine module 34. Incoming air is compressed within the compressor module 30 and directed to the combustor module 32. The compressed air is mixed with fuel to provide the fuel-air mixture that is ignited within the combustor module 32 to generate high speed exhaust gases that drive the turbine module 34.

Prior to entering the gas turbine engine 28, oxygen is removed from the liquid fuel by the fuel stabilization unit 16. Fuel 18 exiting the fuel stabilization unit is in liquid form and includes substantially no dissolved oxygen. Accordingly, with little or no dissolved oxygen in the fuel 18, the temperature range for the fuel to cool other systems is greatly increased hence the thermal capacity of the liquid fuel is greatly increased. The increase in thermal capacity relates to the ability of the liquid fuel 18 to be heated to elevated temperatures, for example temperatures greater than 325° F., without the generation of substantial amounts of "coke". The liquid fuel 18 can thereby provides an increased efficiency heat sink for accepting heat from other systems. In the disclosed example, fuel 18 with little dissolved oxygen is provided to a heat exchanger 20. The heat exchanger 20 provide for the transfer of heat from another system 22 to the liquid fuel 18. The acceptance of heat from other systems elevates the temperature of the liquid fuel 18.

Part of the liquid fuel 18 then flows to a vaporization device 24 were additional heat is input to vaporize at least a portion of the fuel 18. As the fuel 18 includes substantially little or no dissolved oxygen, the fuel can be heated to temperatures causing vaporization of at least a portion of the fuel without the generation of coke within the various conduits and devices that supply fuel to the gas turbine engine 28.

The vaporization device 24 can be any device that inputs, or transfers heat into the fuel to a temperature determined to vaporize a portion of the liquid fuel. The example vaporization device 24 can comprise any device for heating the liquid fuel to temperatures capable of vaporizing the fuel, such as for example another heat exchanger that transfers heat from a heat producing system to the liquid fuel. Further, although the example vaporization device 24 is schematically illustrated separate from the example heat exchanger 20, it is within the contemplation of this invention that this device may be combined.

The example vaporization device 24 can also receives air and/or an oxidizer 36 for mixing with the vaporized fuel to provide a desired air-fuel mixture for the combustor module 32. The example vaporization device 24 can include a mixing device 38 that generates the desired fuel-air mixture 26 for the combustor module 32 includes a desired ration of fuel in liquid phase and in gaseous phase to improve combustion efficiency with then combustor module 32. The inclusion of fuel in vapor phase within the fuel-air mixture entering the combustor module 32 provides improved flame stability within the combustor module 32.

The ratio of fuel in liquid phase to fuel in gaseous phase can be adjusted as desired to provide the desired combustion properties. For example, an increased ratio of fuel in the gaseous form could provide a desired performance for a specific application, where only a small portion of fuel in gaseous form as related to liquid fuel could be provided to conform to other desired performance criteria. A quantity of liquid fuel can be routed to the combustor as is indicated at 25 from before the heat exchanger 20 or before the fuel stabilization unit 16 separate from the vaporized fuel from the vaporization device 24. In this way, a desired combination of liquid fuel and vaporized fuel can be routed to the combustor module 32 to provide the desired mixture that provides the desired flame stability.

Figure 2:
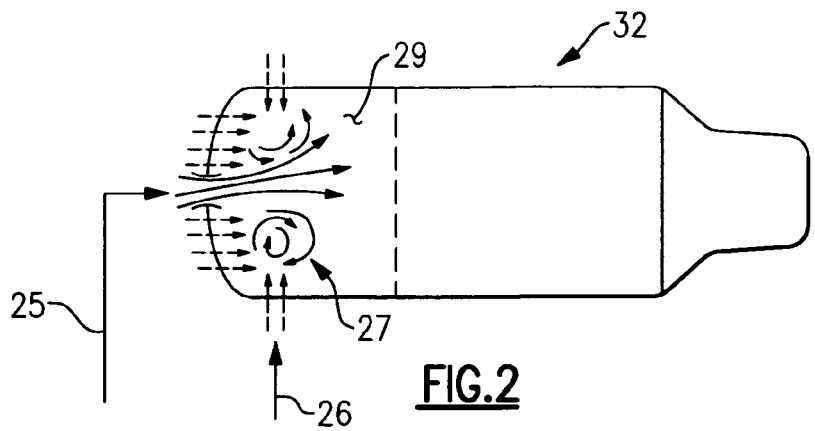
FIG. 2 is a schematic view of a portion of an example combustion module.

Referring to FIG. 2, a portion of the combustor module 32 is schematically shown receiving a portion of liquid fuel 25 and apportion of vaporized fuel-air mixture 26. A primary zone 29 of the combustor 32 receives both the liquid fuel 25 and the vaporized fuel-air mixture 26. It should be noted that although the illustrated example shows a vaporized fuel-air mixture injected into the combustor module 32, just vaporized fuel could also be injected to aid in flame stabilization within the combustor module 32.

The vaporized fuel-air mixture 26 is injected into a zone 27 where fuel and air are re-circulated. The injection of the fuel air mixture 26 into the re-circulating zone increase and improves flame stabilization within the combustor module 32. In the example combustor module 32, the vaporized fuel-air mixture 26 is injected around an inlet for liquid fuel to aid combustion of the liquid fuel and improve flame stability in re-circulating areas. The vaporized fuel-air mixture could be injected in any area of the combustor module to tailor combustion and flame stability as required for a specific application.

Figure 3:
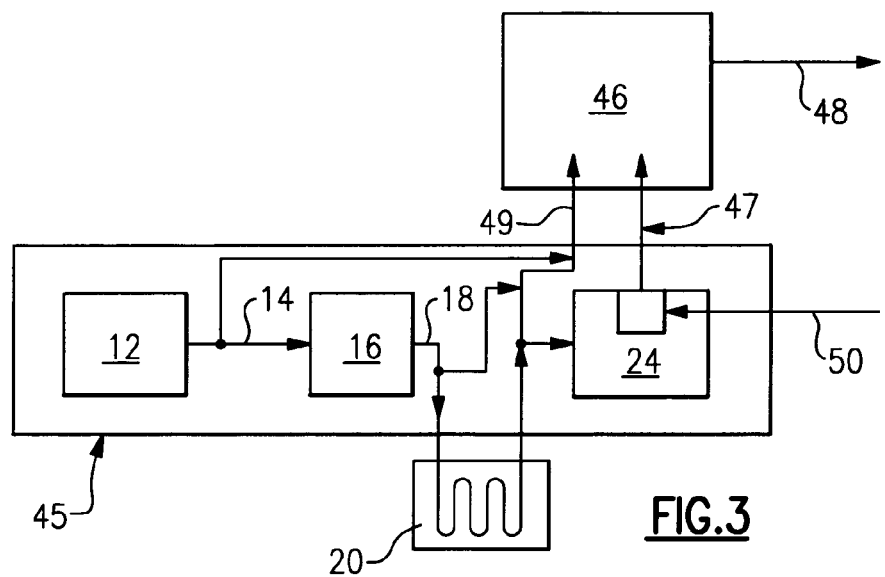
FIG. 3 is a schematic view of another example fuel delivery system.

Referring to FIG. 3, another example fuel delivery system 45 includes the fuel stabilization unit 16 and the vaporization device 24 to provide a vaporized fuel-air mixture 47 to an energy conversion device 46. The vaporized fuel-air mixture 47 can be combined with liquid fuel 49 that is routed to energy conversion device 46 without going through the vaporization device 24. The energy conversion device 46 can comprise not only a gas turbine engine as disclosed above, but also reciprocating engines, and steam engines for example. The energy conversion device 46 converts the chemical energy provided by the fuel-air mixture into a mechanical output schematically indicated at 48.

Air 50 is injected into the vaporization device 24 from an external source for mixing with the combined gaseous liquid phase fuel. The fuel 18 output from the fuel stabilization unit 16 includes a significantly reduced amount of dissolved oxygen such that the thermal capacity of the fuel is increased. The heat exchanger 20 can utilize the fuel 18 to accept and absorb heat from another system.

Figure 4:
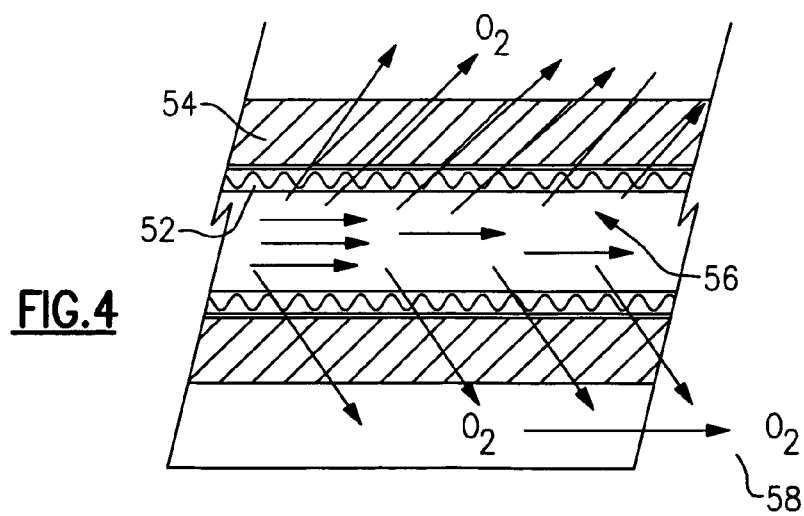
FIG. 4 is a schematic view of a portion of an example fuel stabilization unit.

Referring to FIG. 4, the example fuel stabilization unit 16 includes an oxygen permeable membrane 52 supported on a porous backing 54. Liquid fuel flows through a passage 56 defined at least partially by the permeable membrane 52. An oxygen partial pressure differential is generated across the permeable membrane 52 to draw dissolved oxygen from the liquid fuel. The removed oxygen is then exhausted away from the liquid fuel as indicated at 58 to an external environment or to other systems.

Accordingly, the fuel delivery system of this invention removes significant levels of dissolved oxygen from a liquid fuel to provide for vaporization of fuel prior to entering a combustion device without substantial formation of coking or other insoluble products, thereby improving combustion performance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel delivery system comprising:
    a fuel stabilization unit for removing dissolved oxygen from a liquid fuel stream;
    a heat exchanger disposed downstream of the fuel stabilization device for transferring heat into the liquid fuel stream; and
    a vaporization device spaced apart from the fuel stabilization unit that receives liquid fuel stream exiting the heat exchanger, the vaporization device for transforming at least a portion of the liquid fuel stream into a fuel vapor prior to combustion, wherein the vaporization device receives air for mixing the fuel vapor according to a desired air/fuel ratio prior to entering a combustion module.

2. The system as recited in claim 1, wherein the vaporization device is disposed between the fuel stabilization unit and a combustion module.

3. The system as recited in claim 1, wherein the fuel stabilization unit includes an oxygen permeable membrane disposed adjacent the liquid fuel stream.

4. The system as recited in claim 3, including a partial oxygen pressure differential across the oxygen permeable membrane for driving dissolved oxygen from the liquid fuel stream.

5. A gas turbine engine assembly comprising:
a combustor for igniting an air-fuel mixture;
a fuel stabilization unit for removing dissolved oxygen from a liquid fuel stream;
a heat exchanger receiving the liquid fuel stream exiting the fuel stabilization unit; and
a vaporization device spaced apart from the fuel stabilization unit for transforming at least a portion of the liquid fuel stream into fuel vapor, wherein the fuel vapor is communicated to the combustor, wherein the vaporization device receives liquid fuel exiting the heat exchanger and mixes air with the fuel vapor to provide a desired air/fuel ration prior to entering the combustor.

6. The assembly as recited in claim 5, wherein the vaporization device receives air for pre-mixing the air-fuel mixture prior to entering the combustor.

7. The assembly as recited in claim 5, including a heat exchanger for transferring heat into the liquid fuel stream.

8. The assembly as recited in claim 5, wherein the fuel stabilization unit comprises an oxygen permeable membrane.

9. The assembly as recited in claim 8, including an oxygen partial pressure differential across the oxygen permeable membrane for drawing oxygen from the liquid fuel.

10. The assembly as recited in claim 5, wherein the combustor receives liquid fuel and the fuel vapor from the vaporization device.

11. A method of conditioning fuel prior to combustion comprising the steps of:
 a. removing dissolved oxygen from a liquid fuel stream with a fuel stabilization unit;
 b. rejecting heat into the liquid fuel stream having a reduced amount of dissolved oxygen within a heat exchanger
 c. vaporizing a portion of the liquid fuel stream exiting the heat exchanger prior to entering a combustion module within a vaporizing device spaced apart from the fuel stabilization unit; and
 d. mixing a portion of the vaporized fuel with air to provide a desired air-fuel mixture prior to entering the combustor module.

12. The method as recited in claim 11, wherein step a. includes the step of generating a partial oxygen pressure differential across an oxygen permeable membrane and drawing dissolved oxygen from the liquid fuel stream through the oxygen permeable membrane.

13. The method as recited in claim 11, including the step of transferring heat into the liquid fuel stream after removal of dissolved oxygen.

14. The method as recited in claim 11, including the step of introducing the air-fuel mixture into the combustion module for ignition.

* * * * *